United States Patent [19]
Sato et al.

[11] Patent Number: 5,228,894
[45] Date of Patent: Jul. 20, 1993

[54] PRESS-FORMING METHOD FOR OPTICAL ELEMENT

[75] Inventors: Bunryo Sato, Hachioji; Takeshi Nomura, Tokyo; Kiyoshi Yamamoto, Yokohama; Masaki Ohmori, Kawasaki, all of Japan

[73] Assignee: Canon Kabushiki Kaisha, Tokyo, Japan

[21] Appl. No.: 901,980

[22] Filed: Jun. 22, 1992

[30] Foreign Application Priority Data

Jul. 19, 1991 [JP] Japan .................. 3-203771

[51] Int. Cl.$^5$ ............................................ C03B 23/02
[52] U.S. Cl. ............................................ 65/102; 65/64; 65/85; 65/275
[58] Field of Search ................. 65/102, 64, 83, 85, 65/275, 77

[56] References Cited

U.S. PATENT DOCUMENTS

| | | | |
|---|---|---|---|
| 3,973,942 | 8/1976 | Coen et al. ................. | 65/83 |
| 4,481,023 | 11/1984 | Marechal et al. .......... | 65/64 |
| 4,778,505 | 10/1988 | Hirota et al. ............... | 65/102 |
| 4,836,838 | 6/1989 | Hirota et al. ............... | 65/275 |
| 4,915,720 | 4/1990 | Hirota et al. ............... | 65/64 |
| 5,032,160 | 7/1991 | Murata et al. .............. | 65/102 |

FOREIGN PATENT DOCUMENTS

| | | |
|---|---|---|
| 48-84134 | 11/1973 | Japan . |
| 49-97009 | 9/1974 | Japan . |
| 58-84134 | 5/1983 | Japan . |
| 59-150728 | 8/1984 | Japan . |
| 61-26528 | 2/1986 | Japan . |
| 63-11529 | 1/1988 | Japan . |
| 257140 | 10/1989 | Japan ................. 65/102 |
| 124727 | 5/1990 | Japan ................. 65/102 |
| 196039 | 8/1990 | Japan ................. 65/102 |
| 378199 | 9/1932 | United Kingdom . |

*Primary Examiner*—Joye L. Woodard
*Attorney, Agent, or Firm*—Fitzpatrick, Cella, Harper & Scinto

[57] ABSTRACT

A method for press-forming a glass preform includes the steps of applying positioning pressure to an upper mold as the temperature of the upper mold and a lower mold increase to set values, maintaining a first temperature difference between the upper and lower molds of at least 10° C. and increasing the temperature of the glass preform to a value above its glass transition temperature. Additional steps include cooling the upper and lower molds at a rate of 30° to 100° C. per minute while maintaining a temperature difference between the upper and lower molds at at least the first temperature difference, applying pressure to the lower mold, and opening the upper and lower molds to release the formed optical element after the temperatures of the upper and lower molds decrease to below a set value and a temperature difference between the upper and lower molds becomes greater than the first temperature difference.

9 Claims, 6 Drawing Sheets

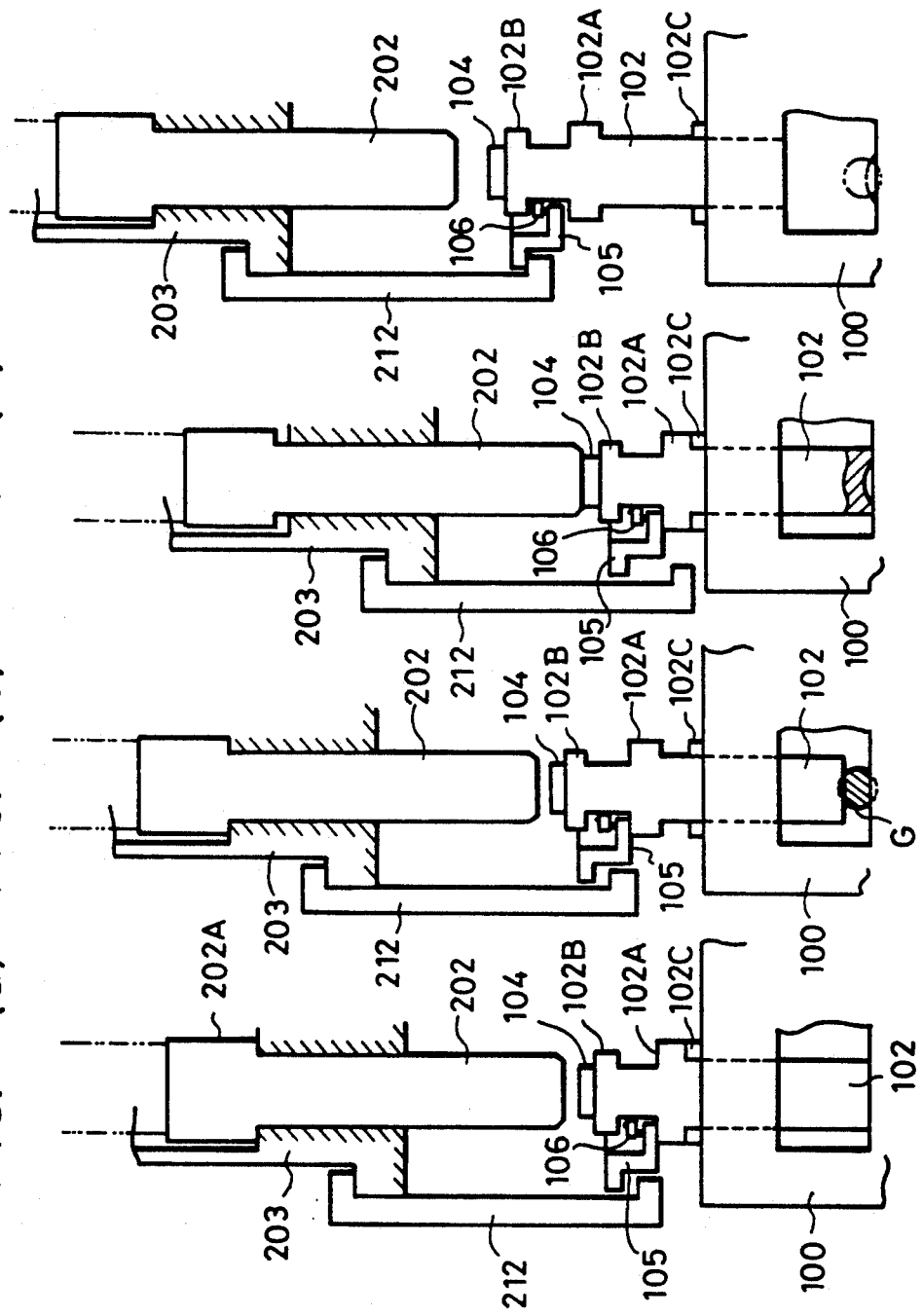

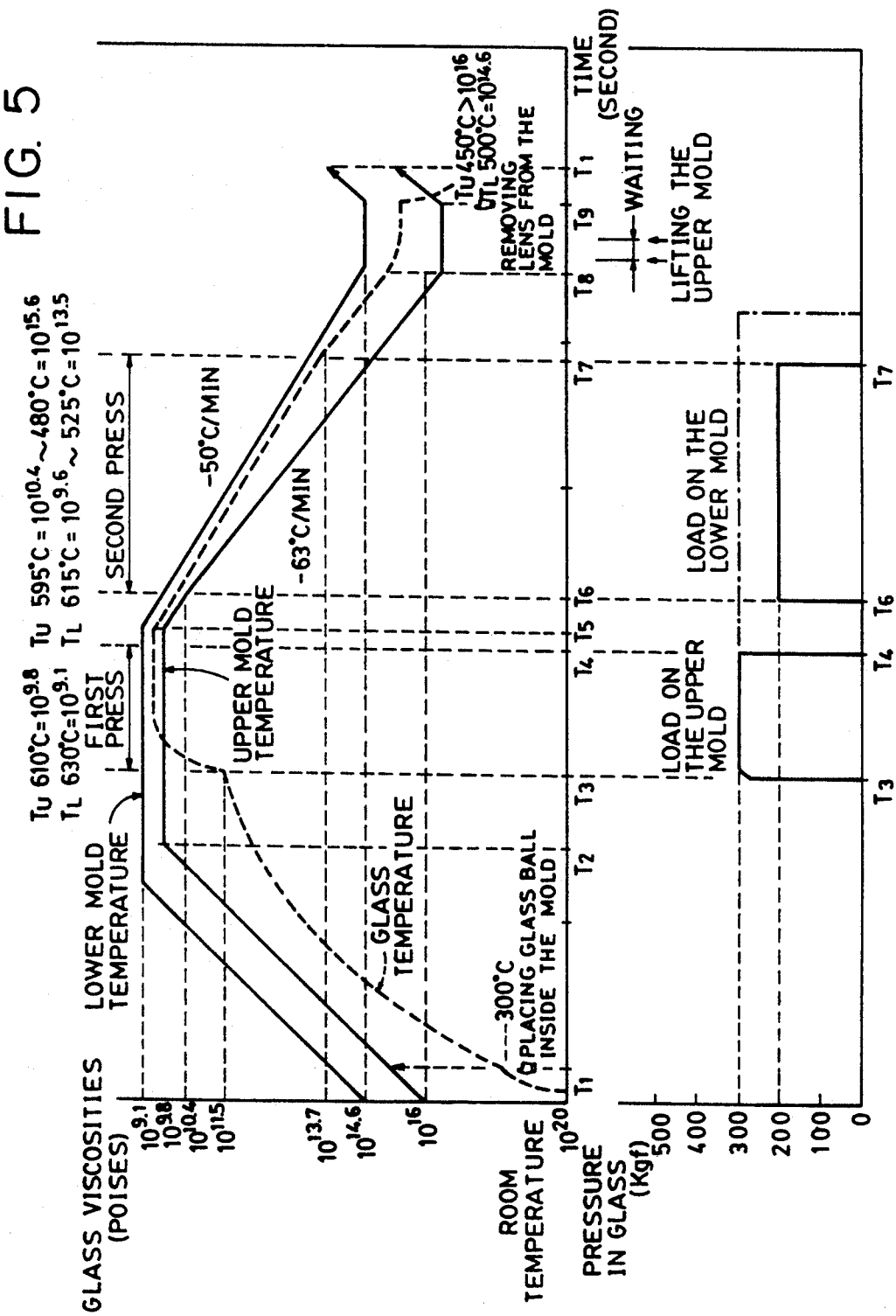

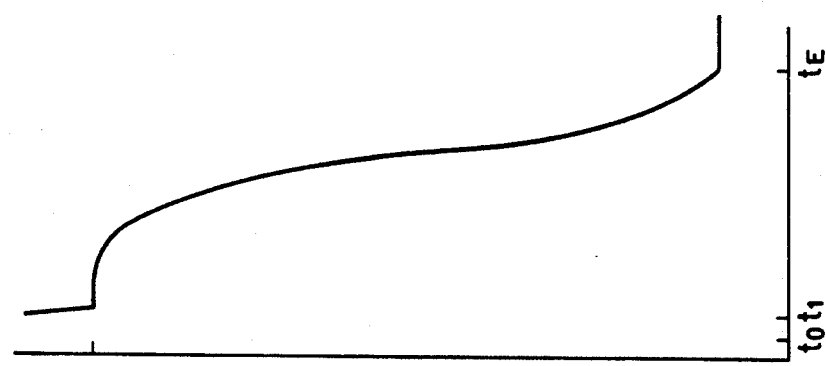
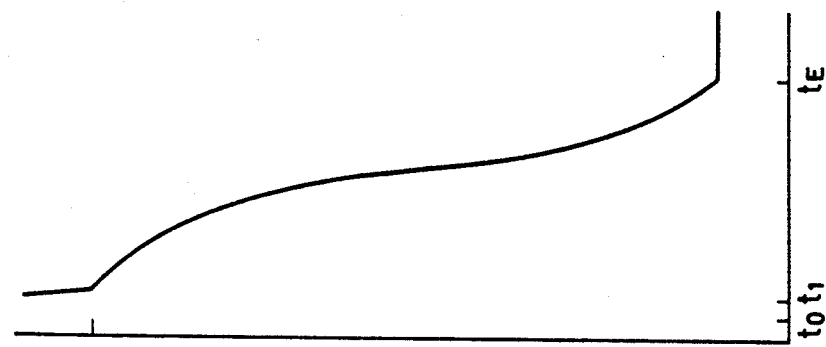
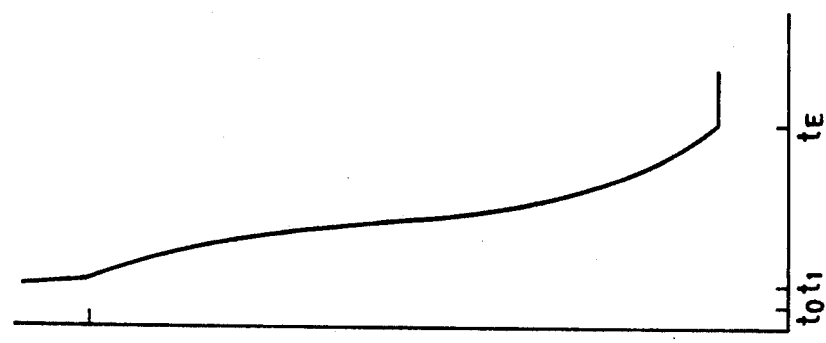
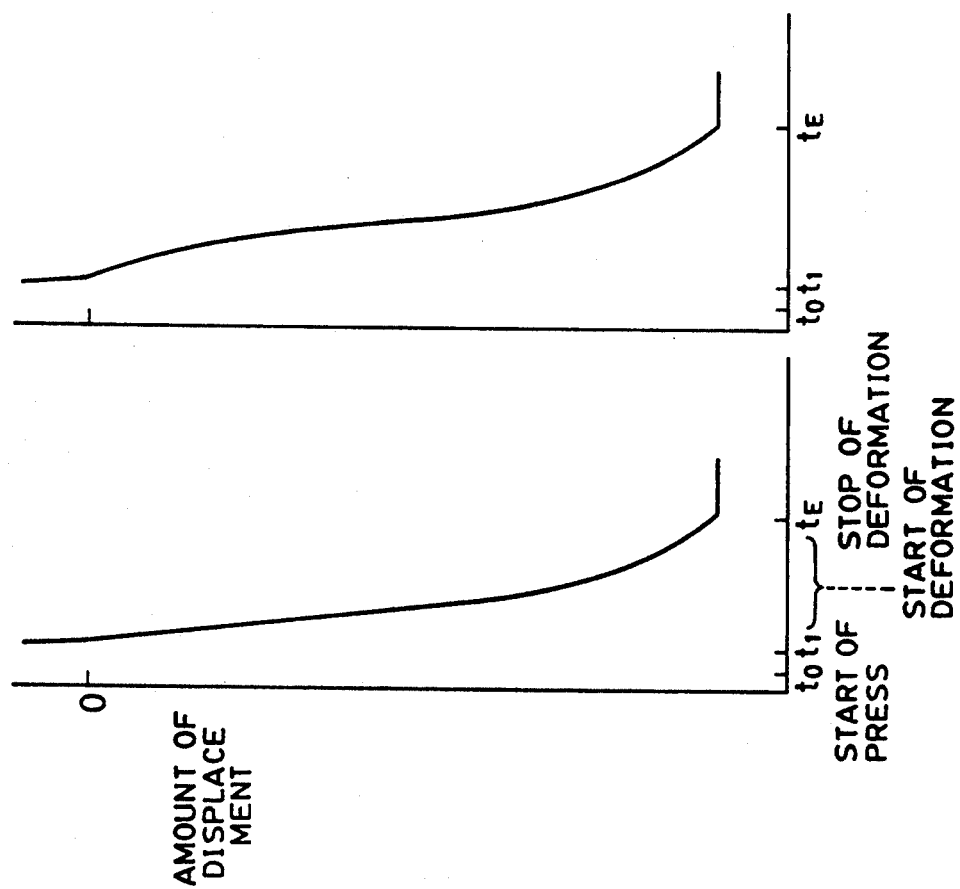

PRESS-FORMING METHOD FOR OPTICAL ELEMENT

BACKGROUND OF THE INVENTION

1. Field of the Invention

This invention relates to a method of forming an optical element wherein a glass preform for optical use is softened by heating and subjected to press-forming.

2. Description of the Related Art

Recently, methods of producing an optical element having a highly precise optical functional surface have been developed in which postprocessing, such as grinding, polishing and the like, becomes unnecessary by accommodating a material for forming an optical element, for example, a glass blank preliminarily formed to a certain shape and surface accuracy, within a forming mold having a predetermined surface accuracy and performing press-forming while heating the material.

In such a press forming method, in general, upper forming molds and lower forming molds are slidably disposed within a mold guide member in a position facing each other. A preform is introduced within cavities formed by the upper and lower forming molds and the mold guide member. The forming molds are heated to a formable temperature, that is, a temperature where the viscosity of the preform becomes $10^8$–$10^{12}$ poises, in a nonoxidizing atmosphere, for example, a nitrogen atmosphere, in order to prevent oxidation of the molds. The molds are then closed and press forming is performed for an appropriate time period to transfer the shapes of the surfaces of the molds to the surfaces of the preform. Subsequently, the molds are cooled to temperatures sufficiently lower than the glass transition temperature of the preform, the press-forming pressure is removed, and formed optical elements are taken out by opening the molds.

The preform may be preliminarily heated to an appropriate temperature before being introduced into the molds, or the preform may be introduced after being heated to a formable temperature. Alternatively, both the preform and the molds are heated, subjected to press forming and cooled at respective predetermined places while conveying them, whereby it is possible to perform continuous operations and high-speed forming.

Press-forming methods and apparatuses for optical elements which adopt the above-described approaches are disclosed, for example, in Japanese Patent Application Public Disclosure (Kokai) Nos. 48-84134 (1973) and 49-97009 (1974), British Patent Specification No. 378199, Japanese Patent Public Disclosure (Kokai) Nos. 63-11529 (1988), 59-150728 (1984) and 61-26528 (1986).

The assignee of the present application has proposed that, in producing optical elements having a relatively large diameter, in a cooling process after preliminarily heating a preform up to a formable temperature, introducing the preform within molds, and performing a press-forming process, using a temperature schedule for stably releasing formed products while maintaining the surface accuracy of the molds, and a second heating means is provided.

However, the following technical problems which must be overcome are present in press forming processing:

(1) In preliminarily heating a glass preform, appropriate heating means and temperature control means are needed in the process of conveying the preform and time is needed for setting conditions for the heating and temperature control means. If the glass preform is introduced within the mold after preliminarily heating the preform to a formable temperature corresponding to a glass viscosity of $10^9$–$10^{10}$ poises, the preform may be deformed or the properties of the preform may change at contact surfaces with a conveying jig during transportation, since the preform is already in a fluid state. If a method, in which a glass preform preliminarily heated to a relatively low temperature is introduced within the molds, heated up to a temperature corresponding to a glass viscosity of $10^9$–$10^{10}$ poises, and subjected to press forming, is adopted in order to overcome the above-described problems, volatile constituents will evaporate from the preform and contaminate the surfaces of the molds, since the time to keep the preform within the molds becomes long and the temperature is high. Hence, the life of the molds will be shortened in spite of a continuosly formable forming process.

(2) The volume of a formed glass product shrinks in a cooling process after press forming. If the molds cannot follow the shrinkage at that time, discontinuous surfaces are produced on the surfaces of the formed product, adversely influencing, for example, optical properties of the formed product in forming an optical element, such as a lens or the like. If the molds are opened too early, the surfaces of the formed product peeled from the formed surfaces of the molds will be deformed, since temperature drop is insufficient. As a result, the expected optical functional surfaces cannot be provided. Accordingly, it is necessary to optimize the functioning pressure and the functioning temperature range of a second pressing means which follows the above-described volume shrinkage, and the temperature schedule of cooling so as to shorten the forming cycle.

(3) In forming an optical element, optical surfaces of a formed product are in optical contact with the corresponding forming surfaces (mirror surfaces) of forming molds when forming has been completed. The state of contact is substantially the same for the upper mold and the lower mold. Accordingly, when the upper mold is raised in order to take out the formed product after the completion of press forming, a so-called upper-mold-adherence phenomenon wherein the formed product adheres to the forming surface of the upper mold while contacting the upper mold will in some cases occur. If the upper-mold-adherence phenomenon occurs, it becomes impossible to perform a mechanical unloading operation in which the formed product is taken out by sucking it with a sucking finger. Accordingly, in a conventional forming method, if the upper-mold-adherence phenomenon has occurred, the automatic operation is stopped, and the temperature of the upper and lower molds is further decreased. After the operator has confirmed that the formed product dropped from the upper mold onto the lower mold, the process is manually returned to the original process. Hence, if the upper-mold-adherence phenomenon occurs, the rate of operation as the forming apparatus is greatly reduced. Another problem when the upper-mold-adherence phenomenon occurs is that, if the above-described monitoring by the operator or a sensor for detecting adherence of the formed product to the upper mold is absent, the sucking finger will collide with the formed product while the formed product adheres to the upper mold. As a result, the formed glass product will be cracked or blown out of the mold. If the formed product does not favorably drop from the upper mold onto the central position of the lower mold, the operation of sucking the formed product with the sucking finger in the unloading stage becomes difficult.

SUMMARY OF THE INVENTION

The present invention has been made in consideration of the above-described problems in the prior art.

It is an object of the present invention to provide a press forming method for an optical element which can obtain a high-precision formed glass product with an excellent yield while overcoming problems which may occur in a press forming process, and which can improve operational efficiency by rationally shortening the press-forming time.

According to one aspect of the present invention, this object is accomplished by providing a method for forming an optical element by press-forming a glass preform for optical use in continuous steps, comprising the steps of heating upper and lower molds slidably disposed within a mold guide member, inserting the glass preform within the upper and lower molds, and heating the glass preform. A first press-forming operation on the glass preform is performed by applying pressure to the upper mold so that it descends to a defined position as the temperatures of the upper and lower molds increase to set values within a temperature range corresponding to a viscosity of the glass forming material of $10^9$ to $10^{11}$ poises, a temperature difference between the upper and lower molds becomes at least 10° C. and the temperature of the glass preform increases to a value within a temperature range corresponding to a viscosity of the glass preform of $10^{12.5}$ to $10^{11}$ poises and exceeding the glass transition temperature of the glass preform. The upper and lower molds are cooled at a rate of 30° to 100° C. per minute while maintaining a temperature difference between the upper and lower molds at at least the temperature difference in the first press-forming step, and a second press-forming is performed on the glass preform by applying pressure to the lower mold as the temperature range of the upper and lower molds is maintained between a high temperature equal to or higher than a temperature corresponding to a viscosity of the glass preform of $10^{10.4}$ poises and a low temperature equal to or lower than a temperature corresponding to a viscosity of the glass preform of $10^{13'}$ poises. The upper and lower molds are opened to release the formed product after the temperatures of the upper and lower molds become equal to or lower than a temperature corresponding to a viscosity of the glass preform of $10^{14}$ poises and a temperature difference between the upper and lower molds becomes greater than the temperature difference in the first press-forming step.

According to another aspect of the present invention, a method for forming an optical element by press-forming a glass preform for optical use in continuous steps comprises the steps of heating upper and lower molds disposed within a forming member, placing the glass preform within the upper and lower molds, and heating the glass preform. A first press-forming operation on the glass preform is performed by applying pressure to the upper mold so it descends to a defined position as the temperatures of the upper and lower molds increase to set values within a first predetermined temperature range, a temperature difference between the upper and lower molds becomes at least 10° C. and the temperature of the glass forming material increases to a value within a second peredetermined temperature range exceeding the glass transition temperature of the glass preform. The upper and lower molds are cooled at a rate of 30° to 100° C. per minute while maintaining a temperature difference between the upper and lower molds at at least the temperature difference in the first press-forming step, and a second press-forming operation is performed on the glass preform by applying pressure to the lower mold as the temperature range of the upper and lower molds is maintained between a high temperature equal to or higher than a first preset temperature and a low temperature equal to or lower than a second preset temperature. The upper and lower molds are opened to release the formed optical product after the temperatures of the upper and lower molds become equal to or less than a third perset temperature and a temperature difference between the upper and lower molds becomes greater than the temperature difference in the first press-forming step.

BRIEF DESCRIPTION OF THE DRAWINGS

FIGS. 4(a)–4(d) are cross-sectional plan views illustrating an operational state of a principal part of the present invention;

FIG. 5 is a graph showing a press forming process of the present invention; and

FIGS. 6(a)–6(d) are diagrams showing patterns corresponding to different temperatures of a glass material in a press-forming process.

DESCRIPTION OF THE PREFERRED EMBODIMENT

Figure 1:
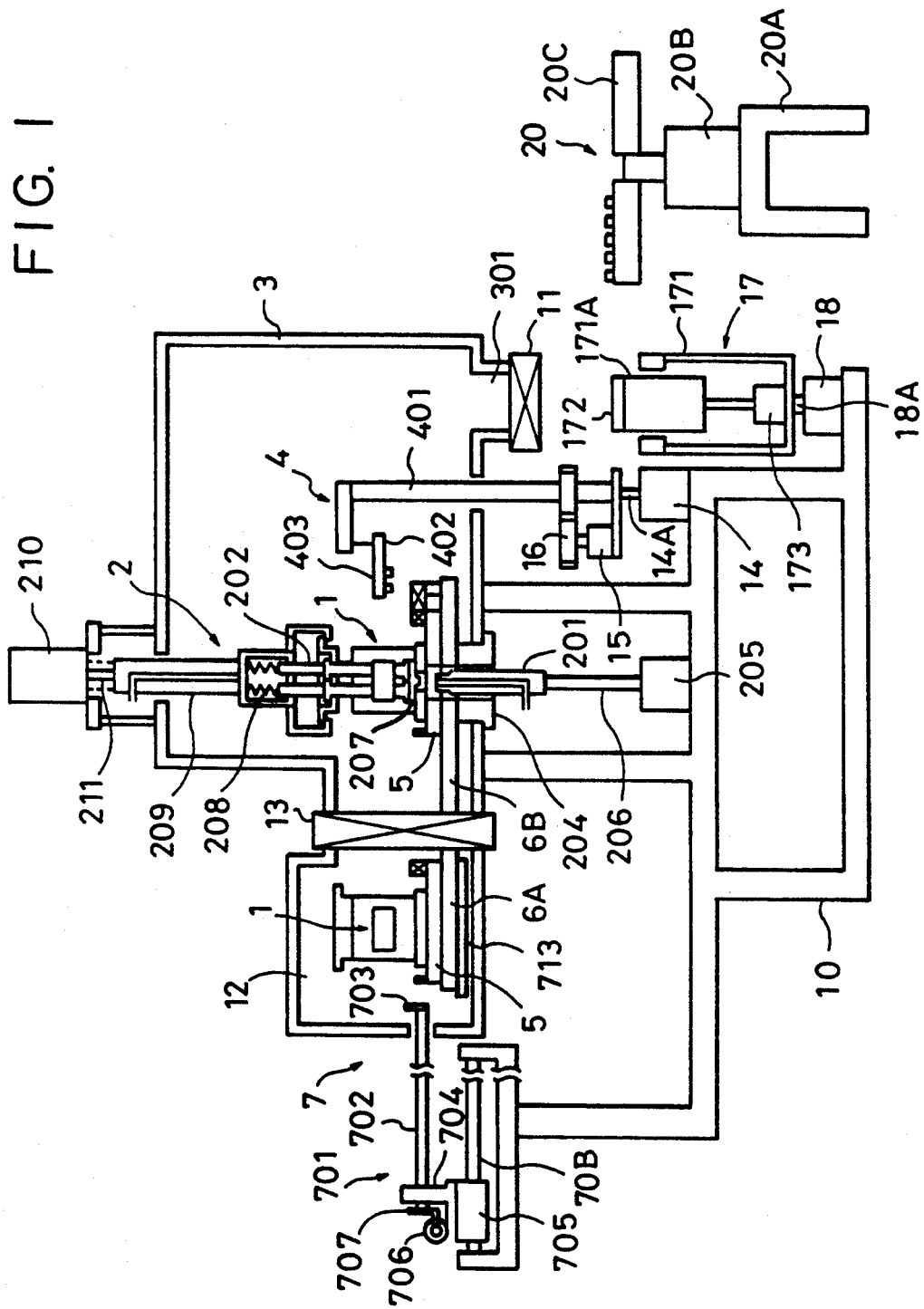
FIG. 1 is a schematic front view of a press forming apparatus according to an embodiment of the present invention.
Figure 2:
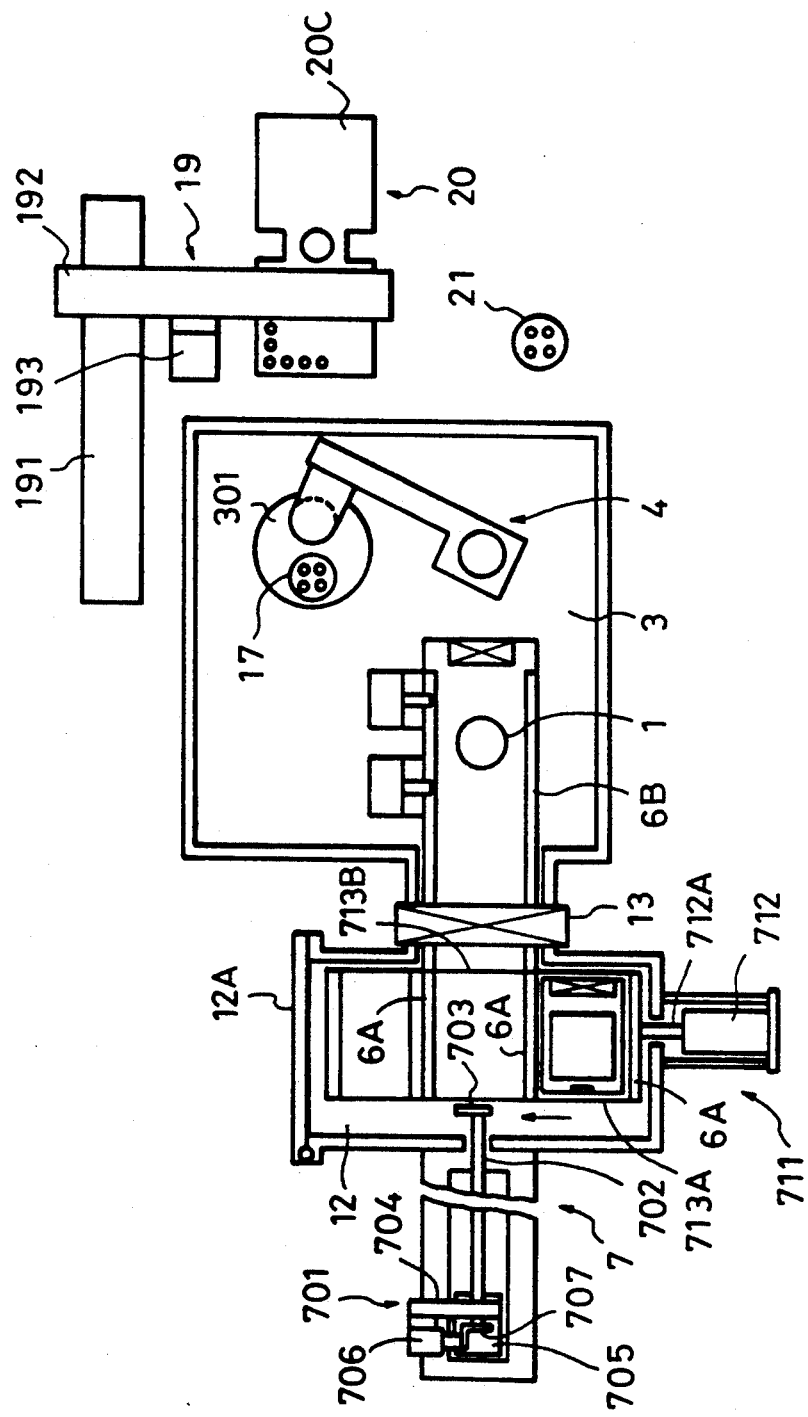
FIG. 2 is a schematic plan view of the press forming apparatus shown in FIG. 1.

A press-forming method according to an embodiment of the present invention will now be explained in detail with reference to the drawings. As shown in FIGS. 1 and 2, the press forming apparatus performs press forming by loading a glass preform (a glass blank) within a forming mold 1 and moving moving units (to be described later) of the forming mold 1 by operating a press operation mechanism 2. This press forming is preferably performed in a nonoxidizing-gas atmosphere, such as nitrogen-gas atmosphere or the like. Accordingly, the forming mold 1, the press operation mechanism 2 and the like are disposed within an air-tight forming chamber 3.

The forming chamber 3 is mounted on a pedestal 10, and provides a gate valve 11 at an entrance 301 for inserting, or placing, a glass preform and taking out formed products. The forming chamber 3 communicates with the outside through the gate valve 11. A forming-mold exchange chamber 12 is disposed on the pedestal 10 adjacent to the forming chamber 3. The exchange chamber 12 communicates with the forming chamber 3 via a gate valve 13.

A replacing means 4 for introducing a glass preform into the forming mold 1 and taking out formed products from the forming mold 1 is provided within the forming chamber 3. The replacing means 4 provides a sucking hand 402 at the upper end of a rotation shaft 401 vertically introduced within the forming chamber 3 through the floor, and a sucking pad 403 at a distal end of the sucking hand 402. The rotation shaft 401 is rotatably connected to a piston rod 14A of a cylinder mechanism 14 provided on the pedestal 10, is vertically operated along the axial direction, and is rotatably operated by an electric motor 15 provided on the piston rod 14A via a gear train 16.

In a state of sucking (or adhering through a suction force) a glass preform on the sucking pad 403, the sucking pad 403 is introduced within the forming mold 1 by the movement in the axial direction and the rotation of the rotation shaft 401 according to the control of the cylinder mechanism 14 and the rotation of the electric motor 15. In a state of sucking a formed product on the sucking pad 403, the formed product is taken out from within the forming mold 1 by the movement in the reverse axial direction and the rotation of the rotation shaft 401.

A carrying means 17 for carrying the glass preform in the forming chamber 3 and carrying the formed product out of the forming chamber 3 is disposed below the entrance 301 on the pedestal 10. The carrying means 17 provides a replacing chamber 171 on a piston rod 18A upwardly extending from a cylinder mechanism 18, and a mount 172 capable of vertically moving from an opening 171A provided at the upper end of the replacing chamber 171 so that the mount 172 can be raised and lowered by lifting means 173 (for example, a piston cylinder mechanism) provided within the replacing chamber 171.

In carrying a glass preform in the forming chamber 3 and carrying a formed product out of the forming chamber 3, the replacing chamber 171 is raised by raising the piston rod 18A by the control of the cylinder mechanism 18 in a state of mounting the glass preform on the mount 172, and the opening 171A of the replacing chamber 171 is made in air-tight contact with the gate valve 11. The air in the replacing chamber 171 is replaced with a predetermined atmosphere, and the gate valve 11 is opened so that the replacing chamber communicates with the forming chamber 3. The mount 172 is then introduced within the forming chamber 3 by the lifting means 173, and the glass material is supplied to the replacing means 4 or the formed product is received from the replacing means 4. Subsequently, the lifting means 173 is lowered to return the mount 172 to the replacing chamber 171, the gate valve 11 is closed, and the relacing chamber 171 is lowered by operating the cylinder mechanism 18. Thus, the formed product can be taken out from the mount 172, or a new piece of the glass preform can be mounted on the mount 172.

As shown in FIG. 2 of the present embodiment, a required robot 19 is used for mounting a glass preform on the mount 172 and taking out a formed product from the mount 172. The robot 19 moves a glass preform from a stocker 20 onto the mount 172 or moves a formed product from the mount 172 to a required place using a sucking means or the like. That is, the robot 19 has an x-axis arm 191 and a y-axis arm 192, and can move a sucking hand 193 provided on the y-axis arm 192 in the x and y directions by operating the two arms. The stocker 20 provides an electric motor 20B on a frame 20A, and fixes a pallet 20C on the rotation shaft of the electric motor 20B. The pallet 20C is rotated by the drive of the electric motor 20B, and the reception of a formed product or the supply of a glass preform is performed at a position corresponding to the movement of the robot 19. In the present embodiment, a cooling mount 21 is separately provided. The formed product taken out from the mount 172 by the sucking hand 193 is temporarily placed on the cooling mount 21, where the formed product is spontaneously or forcedly cooled to a desired temperature.

Figure 3:
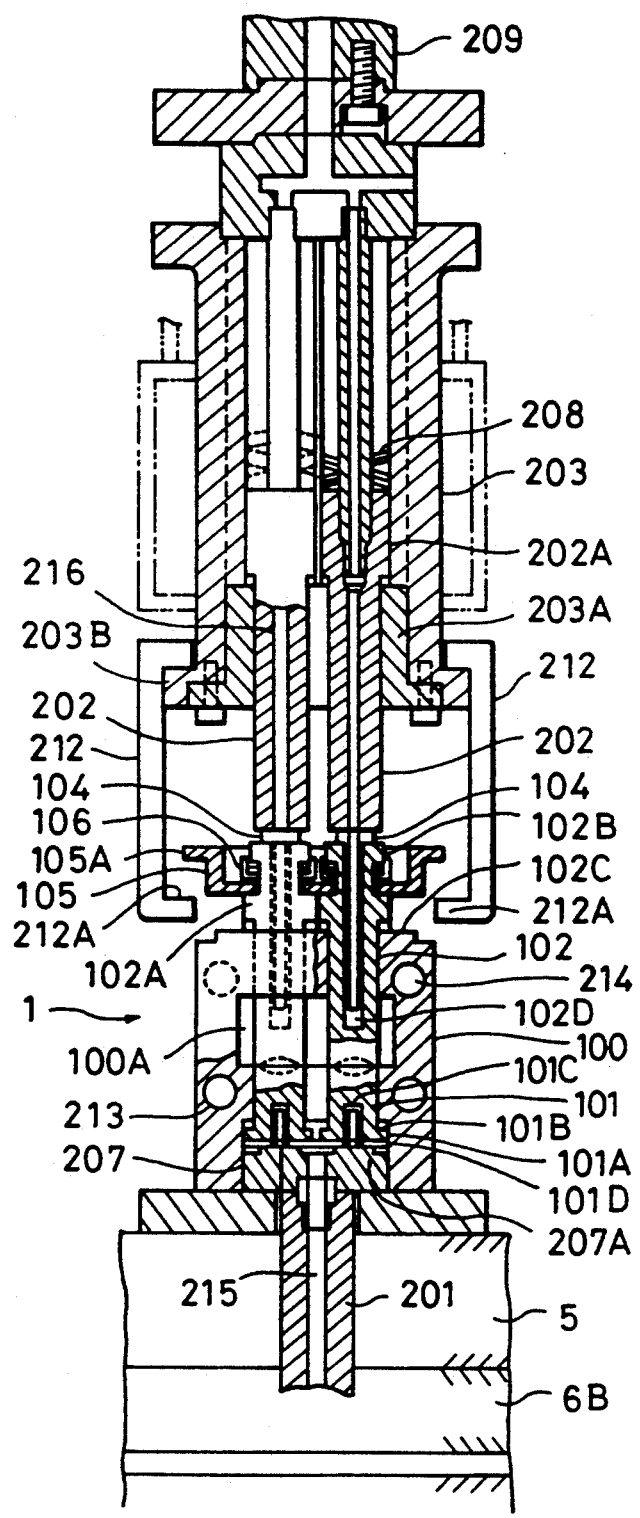
FIG. 3 is a cross-sectional front view showing a principal part of the present invention.

As shown in FIG. 3, the forming mold 1 has a four-piece structure wherein four sets of lower molds 101 and upper molds 102 arranged around the center of a mold guide member 100 are incorporated in the mold guide 100 so as to be vertically slidable therein. An opening 100A is formed at a side portion of the mold guide 100 for the reception of a glass perform and for taking out a formed product using the sucking pad 403. The mold guide 100 is fixedly disposed on the pallet 5 in the forming chamber 3. The pallet 5 is guided from the replacing chamber 12 to a guide rail 6B provided in the forming chamber 3 through the gate valve 13 via a guide rail 6A provided in the exchange chamber 12, and is placed at a press position in the forming chamber 3. Flange members 101A and 102A for restricting the amount of insertion within the mold guide 100 are formed on the molds 101 and 102, respectively.

As shown in FIGS. 1 and 3, the press operation mechanism 2 provides a pushing operational member 201 below the guide rail 6B at the above-described press position and four operational members 202 for press corresponding to the respective upper molds 102 above the forming mold 1, and holds these members with a common holder block 203. The upper end of the operational member 201 can be inserted into the forming chamber 3 from the outside via an annular member 204 provided at the base of the forming chamber 3. The lower end of the operational member 201 is connected to a piston rod 206 upwardly extending from a pushing cylinder mechanism 205. A pushing piece 207 commonly used for the lower molds 101 is mounted at an upper end of the operational member 201, and can commonly push up the lower molds 101 while slidably moving relative to the mold guide 100.

The upper ends of the operational members 202 form a large-diameter portion 202A as a stopper. The operational members 202 vertically move by being guided by a sliding member 203A provided at a lower end of the holder block 203, and are downwardly pressed by an elastic mechanism 208 provided within the holder block 203 until the large-diameter portion 202A contacts the sliding member 203A. Although, in the present embodiment, a structure of laminating disk springs is adopted for the elastic mechanism 208, any other appropriate mechanism or configuration may be adopted.

A common rod 209 is connected to an upper end of the holder block 203. The common rod 209 is threaded through the ceiling of the forming chamber 3 to extend from the inside to the outside thereof, and is connected to a piston rod 211 downwardly extending from a cylinder mechanism 210 above the forming chamber 3.

A small-diameter contact piece 104 provided with a pipe for introducing a coolant at the apex thereof is mounted at the center of each of the upper molds 102. The contact piece 104 can absorb pressure at the center thereof when the operational member 202s descend. A flange member 102B is formed at an upper portion of each of the upper molds 102. An annular pulling member 105 is mounted on the above-described flange members 102A. A gyro-type universal joint 106 is provided between the flange member 102B and the pulling member 105 so as to provide a pulling force at the center of the upper mold 102.

In order to regulate the amount of descent of the upper molds 102 within the mold guide 100, an annular spacer 102C is disposed between the flange members 102A and the apex of the mold guide 100. In order to regulate the amount of rise of the lower molds 101 within the mold guide 100, an annular spacer 101B, and spacers 101C for adjusting the height of the lower molds 101 are disposed above the flange members 101A. In the present embodiment, a hook member 212 mounted on a supporting flange member 203B provided at a lower end of the holder block 203 suspends a flange member 105A of the pulling member 105 by a pawl member 212A provided at a lower end of the hook member 212.

In the above-described embodiment, in order to perform temperature control for the upper and lower molds 101 and 102, electric heaters 213 and 214 are provided within the mold guide 100. Introduction channels 215 and 216 for introducing a coolant are formed in the operational members 201 and 202, and communicate with coolant-introducing members 101D and 102D formed in the upper and lower molds 101 and 102, respectively.

The method of forming formed products of an optical element using the above-described press forming apparatus according to the present invention will now be explained in detail with reference to a press operation mechanism shown in FIGS. 4(a)–4(d) and a graph shown in FIG. 5. The explanation will be provided mainly of a glass preform in the sequence of introduction and forming of the preform and unloading of the formed products. The optical element formed in this embodiment comprises an aspherical lens having a diameter of 10 mm to be used, for example, in an 8-mm video camera or the like.

In a graph shown in FIG. 5, the ordinate $x_1$ represents glass viscosity (temperature), the ordinate $x_2$ represents loads on the upper and lower molds, and the abscissa represents time. The temperatures of the molds are indicated by solid lines, and the temperature of the glass preform is indicated by a broken line. The glass preform G comprises dense barium crown glass having a transition temperature of 550° C. (a temperature corresponding to a glass viscosity of about $10^{12.3}$ poises). Glass blanks previously processed to a spherical shape having a diameter of 7.2 mm and having a surface roughness $R_{max}$ of equal to or less than 0.04 μm are used.

a) Conveyance of the blank

First, the glass preform G is placed on the pallet 20C of the stocker 20. If the rotation shaft of the pallet 20C is rotated by 180 degrees by the drive of the electric motor 20B, the robot 19 is operated to move the sucking hand 193 to the position of the glass material G, and sucks four pieces of the glass preform G from the pallet 20C and holds them. Subsequently, the sucking hand 193 places the glass preform G on the mount 172 by the operation of the robot 19. The glass preform G on the mount 172 is introduced within the forming chamber 3 by the operation of the carrying means 17 in the above-described manner, is sucked and held (time $T_1$) by the sucking pad 403 of the replacing means 4, heated, for example, to a temperature of about 400° C., and is introduced within the forming mold 1. The temperature of the glass preform G at that time is determined by the control temperature of the sucking hand 193 and the time required for handling to be about 300° C. A heater for performing preliminary heating of the material may be provided around the mount 172 to heat the material to a temperature of, for example, about 300° C. However, if the size of the optical element to be formed is relatively small, the effect of the preliminary heating is small. The press mechanism when the sucking pad 403 introduces the glass preform G within the mold 1 is in a state shown in FIG. 4(d), where the press cylinder mechanism 210 stops at an upper position. The temperatures of the upper and lower molds at that time are in a rising process. The glass preform G is introduced when the temperature of the lower mold is 520° C. (corresponding to a glass viscosity of $10^{13.7}$ poises).

b) Heating of the blank

The glass preform G placed on the lower molds 101 stabilizes within 5 seconds, and the upper molds 102 descend in about 10 seconds by the operation of the cylinder mechanism 210 to provide a state shown in FIG. 4(b). At that time, the position of the cylinder mechanism 210 is determined so as to provide a gap of about 0.5 mm between the forming surfaces of the upper molds 102 and the upper ends of the respective pieces of the glass preform G. The temperature of the glass preform is then raised as indicated by the broken line shown in FIG. 5 in a state of being sandwiched between the upper and lower molds. In order to increase the speed of the temperature rise, the forming surfaces of the upper molds 102 may contact the glass preform G in the sandwiched state. However, a gap of 3 mm is provided between the contact pieces 104 and the operational members 202 for pressing so that only the upper molds' own weight is applied to the glass preform G. The opening 100A of the mold guide 100 may be covered with a heat shielding plate (not shown). While the equilibrium temperature of the glass preform G changes according to the contact state of the upper molds 102, the presence or absence of the heat shielding plate, and the like, temperature variance among the four upper molds 102 is within 3° C. both during temperature rise and in equilibrium.

c) Press forming

The temperatures of the upper and lower molds during press forming are set to predetermined values, i.e., 610° C. (corresponding to a glass viscosity of $10^{9.8}$ poises) for the upper molds and 630° C. (corresponding to a glass viscosity of $10^{9.1}$ poises) for the lower molds. The temperature difference of 20° C. is recognized to be effective for preventing the above-described problem, i.e., the upper-mold-adherence phenomenon. For example, if press-forming is performed while maintaining the upper and lower molds at the same temperature, the upper-mold-adherence phenomenon occurs with a probability of about 20–30%. If press forming is performed with setting the upper molds to a temperature 20° C. higher than the temperature of the lower molds, the upper-mold-adherence phenomenon occurs with a probability of about 95%. To the contrary, in the conditions of the present invention, the probability of the occurrence of the upper-mold-adherence phenomenon can be reduced to 2–3%. Even if the temperature difference is set to 10° C., the probability can be reduced to about 10%. If the temperature difference is further increased to 30° C.–40° C., the effect of reducing the probability increases. In practice, however, if the temperature of the lower molds becomes 640° C. (corresponding to a glass viscosity of $10^{8.7}$ poises), minute portions of the glass preform will be fused with the molds during press forming. Hence, care must be taken for this problem. When the upper and lower molds reach the set temperatures (time $T_2$), the glass preform does not reach the equilibrium temperature. The start of pressing (time $T_3$) may be performed at a time period which is most suitable for shortening the forming cycle, i.e., when the temperature of the glass preform is 565°±5° C. (corresponding to a glass viscosity of $10^{11.5}$ poises). If the time for heating and waiting within the molds is longer, the temperature of the glass preform becomes higher, whereby the time required for performing press forming of the glass preform into an optical element is shortened, but the forming cycle is elongated. To the contrary, if the waiting time is short, press-forming is performed while the glass preform is not sufficiently softened. As a result, the glass preform will be destroyed, or the forming surfaces of the upper and lower molds themselves will be locally deformed. Accordingly, press forming must be performed after the temperature of the glass preform exceeds its transition temperature of 550° C.

The glass preform is deformed with the start of processing, whereby the heat-transfer area with the surfaces of the upper and lower molds gradually increases. Hence, the temperature rises rapidly and reaches an intermediate temperature between the temperatures of the upper and lower molds. The manner of the deformation can be monitored by a displacement sensor provided between the upper portion of the forming chamber 3 and the piston rod 211 as the amount of descent of the press cylinder.

Four patterns of the deformation are shown in FIGS. 6(a)–6(d). In FIGS. 6(a)–6(d), the abscissa represents time, and the ordinate represents the amount of displacement. If press-forming is performed when the glass preform reaches its equilibrium temperature of 591° C. (corresponding to a glass viscosity of $10^{10.6}$ poises), the pattern shown in FIG. 6(a) is obtained, where the initial speed from the start of deformation at time $t_1$ has the highest value. However, after the deformation of the glass preform has been completed, the deformation speed until the glass preform has a predetermined thickness is reduced, since frictional resistance is present between the surfaces of the molds and the glass preform. The amount of deformation becomes constant after the glass preform has been cut with pressure. In this case, since the high-temperature glass preform is held within the molds for a long time period, the above-described glass constituents violently volatilize, thereby rapidly contaminating the molds. Hence, continuous forming can be performed only for a few tens of cycles. To the contrary, if press-forming is performed at a temperature of 565° C. (corresponding to a glass viscosity of $10^{11.5}$ poises) of the glass preform according to the present invention, the pattern shown in FIG. 6(b) is obtained. That is, the slope at the initial stage after the start of deformation is less steep than the slope in the pattern shown in FIG. 6(a), and the time required to cut the glass preform with pressure is slightly elongated. If the time held in the molds is further shortened and press-forming is performed at a temperature of 554° C. (corresponding to a glass viscosity of $10^{12.5}$ poises) of the glass preform slightly exceeding its transition temperature, the pattern shown in FIG. 6(c) is obtained. In FIG. 6(c), since the slope at the initial stage of the start of deformation becomes much less steep, the time required for cutting the glass preform with pressure is elongated, and the forming cycle is longer than in the case of FIG. 6(b). If the temperature of the glass preform is 535° C. (corresponding to a glass viscosity of $10^{13.0}$ poises), which is lower than its transition temperature, the glass preform is not deformed during press forming, and local deformation is produced in central portions of the forming surfaces of the upper and lower molds, as described above.

FIG. 4(c) shows a state during press-forming. The oil pressure of the cylinder mechanism 210 is controlled so as to apply a load of about 400±20 kgf/cm² of surface pressure to each glass preform. The elastic mechanism 208 provided within the holder block 203 performs adjustment so that the pressure is uniformly distributed to the operational members 202. The duration of this press-forming is 60 seconds. When the deformation of the glass material has been completed, and the flange members 102A of the upper molds have been made to be in close contact with the apex of the mold guide 100 via the annular spacer 102C, substantially no pressure is applied to the glass preform. As a result, the thickness of the glass preform is defined. Although a variance is present for the four cavities, the time required for cutting the glass preform with pressure is within a range of 40–50 seconds.

d) Cooling

A cooling process is started while the press cylinder mechanism 210 maintains the above-described state of applying pressure, and the upper and lower molds maintain the temperature difference of 20° C. during press-forming. The temperature of the lower molds is decreased at a speed of 50° C. per minute, and is maintained at 500° C. which corresponds to a glass viscosity of $10^{9.6}$ poises. The temperature of the upper molds is decreased at a speed of 50° C. per minute until 595° C., which corresponds to a glass viscosity of $10^{9.6}$ poises, where the pushing cylinder mechanism 205, serving as the second press means, operates, and at a speed of about 63° C. per minute thereafter. This second cooling speed is controlled by flowing a low-temperature non-oxidizing gas as the coolant from the coolant-introducing members 102D of the upper molds 102. The temperature descent is performed until it reaches 450° C., which corresponds to a glass viscosity of $10^{16}$ poises, and this temperature is maintained. This temperature schedule has a remarkable effect for preventing the above-described upper-mold-adherence effect, and it becomes thereby possible to reduce the probability of the occurrence of the phenomenon from 2–3% to substantially 0%. In this case, the speed of the temperature descent of the upper molds can be within 30°–100° C. per minute, and therefore can be controlled not by cooling while heating, but by flowing the coolant also to the lower molds 101. The speed of the temperature descent can be determined according to the required quality of the formed optical element, the heat capacity of the molds, and the cooling capability of the coolant. The temperature schedule of the upper and lower molds may differ from that shown in FIG. 5. That is, the cooling speeds of the upper and lower molds may have the same value until a temperature where the pressure is released by the second press means, and thereafter the cooling speed of the upper molds may be controlled so as to be higher than that of the lower molds, and releasing may be performed after the temperature difference between the upper and lower molds has increased.

e) Second press

In order to transfer the shapes of the forming surfaces of the molds to an optical element with the required accuracy when the volume of the glass preform shrinks during the cooling process, it is necessary to control a second press-forming by the pushing cylinder mechanism 205. The value of the pressure at that time is 270±20 kgf/cm² of surface pressure. The operational temperature is preferably within a temperature range corresponding to glass viscosities of $10^{10.4}$–$10^{15.6}$ poises, that is, a temperature range between 595° C. and 480° C., for the upper molds, and within a temperature range corresponding to glass viscosities of $10^{9.6}$–$10^{13.5}$ poises, that is, between 615° C. and 525° C., for the lower molds.

If the temperature to start the second press-forming is higher than the above-described values, reduction of the thickness of the glass preform by the second press-forming cannot be neglected, and the lower molds will become tilted. Hence, there is the possibility of increasing eccentricity in first and second optical surfaces of the optical element. If the temperature to terminate the second press-forming is reduced, stress and strain increase. Hence, there is the possibility of producing cracks during cooling. Accordingly, in order to sufficiently maintain the shape and accuracy of the optical element, it is necessary to perform second press forming until the temperature of the upper and lower molds reaches a temperature (534° C.) corresponding to a glass viscosity of equal to or less than $10^{13}$ poises.

f) Releasing

After the pressure of the cylinder mechanism 210 for pressing has been released and it has been upwardly driven, the upper molds 102 are upwardly moved by the hook member 212 via the annular pulling member 105, whereby the molds are opened to release the formed products. Subsequently, when the upper molds 102 have been raised to and have stopped at a position shown in FIG. 4(d), the above-described sucking pad 403 takes out the formed products from between the lower molds 101 and the upper molds 102. At that time, the formed products are returned to the mount 172 by the reverse operation of the above-described replacing means 4, and are taken out from the forming chamber 3 by the above-described carrying means 17. The formed products are temporarily place on the cooling mount 21, and are taken out to the outside after being cooled to an appropriate temperature.

The temperatures of the upper and lower molds when the formed products are released correspond to a glass viscosity equal to or less than $10^{16}$ poises, i.e., 450° C., and a glass viscosity of $10^{14.6}$ poises, i.e., 500° C., respectively. However, the temperatures in the present invention are not limited to these temperatures. That is, the temperature difference required between the upper and lower molds for preventing the upper-mold-adherence phenomenon while the temperatures of the respective molds correspond to glass viscosities equal to or less than $10^{14}$ poises can be changed according to conditions, such as the shape of the optical element, the temperatures of the molds during press forming, and the like. The present invention has a feature in that when the upper molds 102 are upwardly moved by the pulling member 105 within a range of 0.5–5 mm after the molds have been opened, the upper molds 102 stop for a time period between 2 to 15 seconds, for example, 10 seconds. This intermediate stoppage is performed for the purpose of dropping the optical element onto the center of the lower mold without damaging the optical element and the forming surface of the lower mold if the upper-mold-adherence phenomenon has occurred. As described above, this function can be utilized only when a temperature difference is provided between the upper and lower molds. Actually, if cooling is performed at an equal speed while maintaining the temperature difference of 20° C. between the upper and lower molds during press forming, and the molds are immediately opened when the temperature of the upper molds is 460° C. and the temperature of the lower mold is 480° C., the above-described upper-mold-adherence phenomenon may in some cases occur. In such a case, the optical element will not drop under the above-described temperature conditions even after the lapse of a few minutes. That is, the time of stoppage of the upper molds of 2–15 seconds is considered to be the time required for the temperature distribution within the optical element to become uniform.

As described above, according to the present invention, it is possible to overcome conventional problems which occur in the process of press-forming, and to obtain high-precision formed products of an optical element with an excellent yield. Furthermore, it is possible to rationally shorten the forming time, and to greatly increase the rate of operation.

What is claimed is:

1. A method for forming an optical element by press-forming a glass preform for optical use in continuous steps, said method comprising the steps of:

heating upper and lower molds slidably disposed within a mold guide member;

placing the glass preform between the upper and lower molds;

heating the glass preform;

performing a first press-forming operation on the glass preform by applying pressure to the upper mold so it descends to a defined position as the temperatures of the upper and lower molds increase to set values within a temperature range corresponding to a viscosity of the glass preform of $10^9$ to $10^{11}$ poises, a temperature difference between the upper and lower molds becomes at least 10° C. and the temperature of the glass preform increases to a value within a temperature range corresponding to a viscosity of the glass preform of $10^{12.5}$ to $10^{11}$ poises exceeding the glass transition temperature of the glass preform;

cooling the upper and lower molds at a rate of 30° to 100° C. per minute while maintaining a temperature difference between the upper and lower molds at at least the temperature difference in said first press-forming step;

performing a second press-forming operation on the glass preform by applying pressure to the lower mold as a temperature range of the upper and lower molds is maintained between a high temperature equal to or higher than a temperature corresponding to a viscosity of the glass preform of $10^{10.4}$ poises and a low temperature equal to or lower than a temperature corresponding to a viscosity of the glass preform of $10^{13}$ poises; and opening the upper and lower molds to release the formed optical element after the temperatures of the upper and lower molds become equal to or lower than a temperature corresponding to a viscosity of the glass preform of $10^{14}$ poises and a temperature difference between the upper and lower molds becomes greater than the temperature difference in said first press-forming step.

2. A method according to claim 1, wherein the method further comprises the step of providing a plurality of slidably disposed upper and lower molds for receiving the glass preform and forming a plurality of optical elements.

3. A method for forming an optical element by press-forming a glass preform for optical use in continuous steps, said method comprising the steps of:

heating upper and lower molds disposed within a forming member;

placing the glass preform between the upper and lower molds;

heating the glass forming material;

performing a first press-forming operation on the glass preform by applying pressure to the upper mold so it descends to a defined position as the temperatures of the upper and lower molds increase to set values within a first predetermined temperature range, a temperature difference between the upper and lower molds becomes at least 10° C. and the temperature of the glass preform increases to a value within a second predetermined temperature range exceeding the glass transition temperature of the glass preform;

cooling the upper and lower molds at a rate of 30° to 100° C. per minute while maintaining a temperature difference between the upper and lower molds at at least the temperature difference in said first press-forming step;

performing a second press-forming operation on the glass preform by applying pressure to the lower mold as a temperature range of the upper and lower molds is maintained between a high temperature equal to or higher than a first preset temperature and a low temperature equal to or lower than a second preset temperature; and opening the upper and lower molds to release the formed optical element after the temperatures of the upper and lower molds become equal to or less than a third preset temperature and a temperature difference between the upper and lower molds becomes greater than the temperature difference in said first press-forming step.

4. A method according to claim 3, further comprising the step of slidably disposing the upper and lower molds.

5. A method according to claim 4, further comprising the step of providing the forming member with a barrel-shape.

6. A method according to claim 5, further comprising the steps of providing the set values of the first predetermined temperature range to correspond to a viscosity of the glass preform of $10^9$ to $10^{11}$ poises, and providing the value of the second predetermined temperature range to correspond to a viscosity of the glass preform of $10^{12.5}$ to $10^{11}$ poises.

7. A method according to claim 6, further comprising the steps of providing the first preset temperature to correspond to a viscosity of the glass preform of $10^{10.4}$ poises and providing the second preset temperature to correspond to a viscosity of the glass preform of $10^{13}$ poises.

8. A method according to claim 7, further comprising the step of providing the third preset temperature to correspond to a viscosity of the glass preform of $10^{14}$ poises.

9. A method according to claim 8, further comprising the step of providing a plurality of slidably disposed upper and lower molds for receiving the glass preform and forming a plurality of optical elements.

* * * * *

UNITED STATES PATENT AND TRADEMARK OFFICE
CERTIFICATE OF CORRECTION

PATENT NO. : 5,228,894
DATED : July 20, 1993
INVENTOR(S) : Sato, et al.

It is certified that error appears in the above-indentified patent and that said Letters Patent is hereby corrected as shown below:

COLUMN 1:

Line 68, "preform" should read --preform,--.

COLUMN 3:

Line 66, "forming material" should read --preform--.

COLUMN 4:

Line 43, "moving" (second occurrence) should be deleted.

Signed and Sealed this

Twelfth Day of April, 1994

Attest:

BRUCE LEHMAN

*Commissioner of Patents and Trademarks*

*Attesting Officer*